United States Patent
Dudziak et al.

(10) Patent No.: US 6,470,032 B2
(45) Date of Patent: Oct. 22, 2002

(54) SYSTEM AND METHOD FOR SYNCHRONIZING TELECOM-RELATED CLOCKS IN ETHERNET-BASED PASSIVE OPTICAL ACCESS NETWORK

(75) Inventors: Thaddeus J. Dudziak, Pleasanton, CA (US); Dumitru Gruia, San Ramon, CA (US); Joseph G. DeCarolis, San Ramon, CA (US)

(73) Assignee: Alloptic, Inc., Livermore, CA (US)

( * ) Notice: Subject to any disclaimer, the term of this patent is extended or adjusted under 35 U.S.C. 154(b) by 29 days.

(21) Appl. No.: 09/813,774

(22) Filed: Mar. 20, 2001

(65) Prior Publication Data

US 2002/0136232 A1 Sep. 26, 2002

(51) Int. Cl.[7] ............................. H04B 10/00; H04J 3/06; H03D 3/24
(52) U.S. Cl. ...................... 370/503; 370/516; 359/158; 375/356; 375/376
(58) Field of Search ............................ 370/395.62, 465, 370/470, 503, 516–517, 520; 359/109, 154, 158, 159, 168; 375/354

(56) References Cited

U.S. PATENT DOCUMENTS

| 5,543,951 | A | | 8/1996 | Moehrmann | |
|---|---|---|---|---|---|
| 5,684,841 | A | * | 11/1997 | Chiba et al. | 375/354 |
| 5,796,795 | A | * | 8/1998 | Mussman et al. | 370/517 |
| 5,978,374 | A | | 11/1999 | Ghaibeh et al. | |
| 6,011,637 | A | * | 1/2000 | Pfeiffer | 359/120 |
| RE36,633 | E | | 3/2000 | Fleischer et al. | |
| 6,038,226 | A | | 3/2000 | Ellersick et al. | |
| 6,044,122 | A | | 3/2000 | Ellersick et al. | |
| 6,262,997 | B1 | * | 7/2001 | Quayle | 370/503 |

* cited by examiner

*Primary Examiner*—Wellington Chin
*Assistant Examiner*—Maikhanh Tran
(74) *Attorney, Agent, or Firm*—Mark A. Wilson (57) ABSTRACT

A system and method for synchronizing clocks related to telecommunications throughout s point-to-multipoint optical network utilizes downstream data timed using a high frequency transmission clock to distribute timing information of a central telecom-based clock to remote terminals. In an exemplary embodiment, the point-to-multipoint optical network system is an Ethernet-based passive optical network (PON) system that operates in accordance with a Gigabit Ethernet standard. The timing information of the central telecom-based clock is extracted from the downstream data at each remote terminal by recovering the high frequency transmission clock and then, deriving a reference clock, which is synchronized with the central telecom-based clock, from the recovered transmission clock. The reference clock is then used to generate one or more telecom-related clocks that are needed by the remote terminal. The system and method allows telecom-related clocks throughout the system to be synchronized in an efficient and cost-effective manner.

28 Claims, 6 Drawing Sheets

SYSTEM AND METHOD FOR SYNCHRONIZING TELECOM-RELATED CLOCKS IN ETHERNET-BASED PASSIVE OPTICAL ACCESS NETWORK

FIELD OF THE INVENTION

The invention relates generally to optical access networks, and more particularly to a system and method for synchronizing telecom clocks throughout a passive optical access network.

BACKGROUND OF THE INVENTION

The explosion of the Internet and the desire to provide multiple communications and entertainment services to end users have created a need for a broadband network architecture that improves access to end users. Although the bandwidth of backbone networks has experienced a substantial growth in recent years, the bandwidth provided by access networks has remained relatively unchanged. Thus, the "last mile" still remains a bottleneck between a high capacity LAN or Home network and the backbone network infrastructure.

Digital Subscriber Line (DSL) and Cable Modem (CM) technologies offer some improvements over more conventional last mile solutions. However, these technologies still do not provide enough bandwidth to support emerging services such as Video-On-Demand (VoD) or two-way video conferencing. In addition, not all customers can be covered by DSL and CM technologies due to distance limitations.

One broadband access network architecture that offers a solution to the "last mile" problem is a point-to-multipoint passive optical network (PON). A point-to-multipoint PON is an optical access network architecture that facilitates broadband communications between an optical line terminal (OLT) and multiple remote optical network units (ONUs) over a purely passive optical distribution network. A point-to-multipoint PON utilizes passive fiber optic splitters and combiners to passively distribute optical signals between the OLT and the remote ONUs.

In the past, much of the PON development has been focused on ATM-based PONs. However, in recent years, there has been a growing interest in Ethernet-based PONs. This growing interest is partly due to the fact that about ninety-five percent (95%) of LANs currently use the Ethernet protocol. Therefore, Ethernet-based PONs are much more preferable than ATM-based PONs to interconnect Ethernet networks. Another contributing factor is that Ethernet is more compatible with the IP protocol, which is the protocol for the Internet.

However, unlike ATM, Ethernet was not originally designed to provide synchronization of telecom clocks to facilitate proper voice transmission through an Ethernet-based network. Therefore, in an Ethernet-based PON, synchronized telecom clocks may have to be independently extracted by the OLT and the ONUs from one or more external sources, such as central offices. Alternatively, a telecom clock may have to be distributed from a single source, such as the OLT, to the rest of the network, e.g., the ONUs, over a different transmission medium than the optical fibers that interconnect the OLT and the ONUs. However, these solutions significantly increase the overall cost of the PON components, as well as increase the complexity of the Ethernet-based PON.

In view of the above concern, there is a need for a system and method for economically and efficiently synchronizing telecom clocks throughout an Ethernet-based PON.

SUMMARY OF THE INVENTION

A system and method for synchronizing clocks related to telecommunications throughout s point-to-multipoint optical network utilizes downstream data timed using a high frequency transmission clock to distribute timing information of a central telecom-based clock to remote terminals. In an exemplary embodiment, the point-to-multipoint optical network system is an Ethernet-based passive optical network (PON) system that operates in accordance with a Gigabit Ethernet standard. The timing information of the central telecom-based clock is extracted from the downstream data at each remote terminal by recovering the high frequency transmission clock and then, deriving a reference clock, which is synchronized with the central telecom-based clock, from the recovered transmission clock. The reference clock is then used to generate one or more telecom-related clocks that are needed by the remote terminal. The system and method allows telecom-related clocks throughout the system to be synchronized in an efficient and cost-effective manner.

A method of synchronizing clocks related to telecommunications in a point-to-multipoint optical network in accordance with the present invention includes the steps of deriving a telecom-based clock at a first network terminal of the optical network from an external source, generating a data transmission clock from the telecom-based clock, transmitting data in variable-length packets from the first network terminal using the data transmission clock to embed a timing information of the telecom-based clock into the data, deriving a reference clock by extracting the timing information of the telecom-based clock from the data, and generating a remote telecom-related clock from the reference clock. The data transmission clock, the reference clock and the remote telecom-related clock are substantially synchronized with the telecom-based clock. The variable-length packets may be substantially compliant to an Ethernet-based protocol, such as a Gigabit Ethernet-based protocol.

The method may further include the step of generating a transmission-based clock using the transmission rate of the data. The transmission-based clock is substantially synchronized with the data transmission clock that defined the transmission rate. In an embodiment, two phase shifted transmission-based clocks are generated using the transmission rate.

In an exemplary embodiment, the clocks that are used by the method may be as follows: the data transmission clock may be a 125 MHz clock; the telecom-based clock and the reference clock may be 8 kHz clocks; the two phase shifted transmission-based clocks may be 62.5 MHz clocks that are phase shifted by 180 degrees to each other; and the telecom-related clock may be a 1.544 MHz clock, a 2.048 MHz clock, a 51.84 MHz clock, or any multiples thereof.

A system in accordance with the present invention includes a central access module coupled to an external telecommunications network, and a number of remote terminals optically coupled to the central access module. The central access module includes a network interface that is configured to obtain a telecom-based clock from the external telecommunications network, a transmission clock generator configured to generate a data transmission clock using the telecom-based clock, and a transmitting sub-system that transmits said data in variable-length packets at a prescribed data rate, which is defined by the data transmission clock to carry timing information of the telecom-based clock with the data. The data transmission clock is substantially synchronized with the telecom-based clock. The transmitting sub-system may be configured to transmit data in variable-length packets that are substantially compliant to an Ethernet-based protocol, such as a Gigabit Ethernet-based protocol.

Each remote terminal of the system includes a receiving sub-system that extracts the timing information of the telecom-based clock from the data and generates a reference clock, and a remote clock generator configured to generate a remote telecom-related clock from the reference clock. The remote telecom-related clock is substantially synchronized with the telecom-based clock at the central access module.

The receiving sub-system of a remote terminal may include a physical layer module that generates one or more transmission-based clock from the data transmitted from the central access module, and a frequency divider operatively coupled to the physical layer module that generates the reference clock from the transmission-based clock, which is substantially synchronized with said data transmission clock. In an embodiment, the physical layer module may be configured to generate two phase shifted transmission-based clocks.

In an exemplary embodiment, the clocks that are used by the system may be as follows: the data transmission clock may be a 125 MHz clock; the telecom-based clock and the reference clock may be 8 kHz clocks; the two phase shifted transmission-based clocks may be 62.5 MHz clocks that are phase shifted by 180 degrees to each other; and the telecom-related clock may be a 1.544 MHz clock, a 2.048 MHz clock, a 51.84 MHz clock, or any multiples thereof.

Other aspects and advantages of the present invention will become apparent from the following detailed description, taken in conjunction with the accompanying drawings, illustrated by way of example of the principles of the invention.

DETAILED DESCRIPTION OF THE INVENTION

Figure 1:
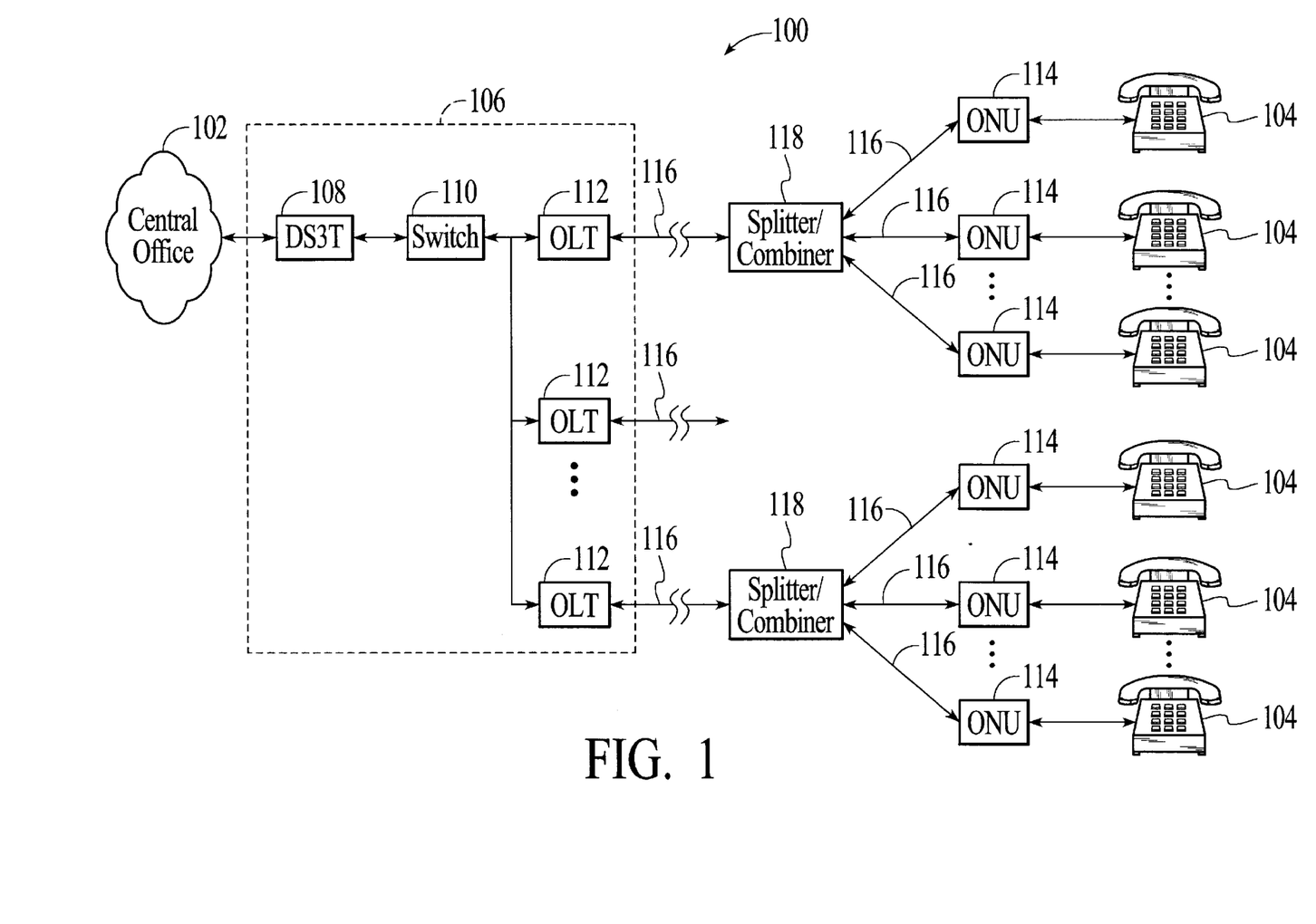
FIG. 1 is a block diagram of an Ethernet-based passive optical network (PON) system in accordance with the present invention.

With reference to FIG. 1, an Ethernet-based passive optical network (PON) system 100 in accordance with the present invention is shown. The PON system provides telecommunications between a central office 102 and a number of telephones 104 supported by the PON system. The central office and the supported telephones are connected to the PON system through conventional telecommunication lines, such as DS3 lines or T-1 lines. The PON system maintains synchronization of clocks related to telecommunications throughout the system in an efficient and economic manner.

The Ethernet-based PON system 100 includes a central access module 106 that functions as a central hub for the system. The central access module contains a DS3 terminal (DS3T) 108, a switch 110, and a number of optical line terminals (OLTs) 112. In an exemplary embodiment, the central access module is a chassis-based system that contains eight (8) OLTs. Each OLT of the system is connected to a number of optical network units (ONUs) 114 by optical fibers 116 and one or more splitter/combiners 118. As an example, each OLT may be connected to sixteen (16) ONUs. Thus, the PON system may support a total of one hundred twenty-eight (128) ONUs. In an embodiment, the PON system uses the IEEE 802.3 z protocol (commonly referred to as Gigabit Ethernet) to transmit variable-length packets of data between the OLTs and the ONUs. The ONUs of the system are connected, either directly or indirectly, to the telephones 104, which are supported by the PON system. Although only a single telephone is shown to be connected to each ONU in FIG. 1, additional telephones may be connected to each ONU. The number of telephones that can be connected to an ONU is dependent on the bandwidth and the number of the telecommunications lines provided by that ONU. For example, if an ONU is connected to a single T1 line, the ONU may be connected to and support up to thirty-two (32) telephones. In an embodiment, the telephones may be connected to a central phone switch, such as a PBX, which is connected to the ONU.

In order to provide acceptable quality voice communications between the telephones 104 and the central office 102, the telecom clocks used by the OLTs 112 for telecommunications should be synchronized with the corresponding telecom clocks used by the ONUs 114. A problem with providing synchronization between the OLTs and the ONUs is that the connections between the OLTs and the ONUs are based on Ethernet, and conventional Ethernet architectures are not designed to provide synchronization of telecom clocks across Ethernet connections. Therefore, the PON system 100 must resolve this problem of telecom clock synchronization in order to provide acceptable quality voice communications.

Figure 2:
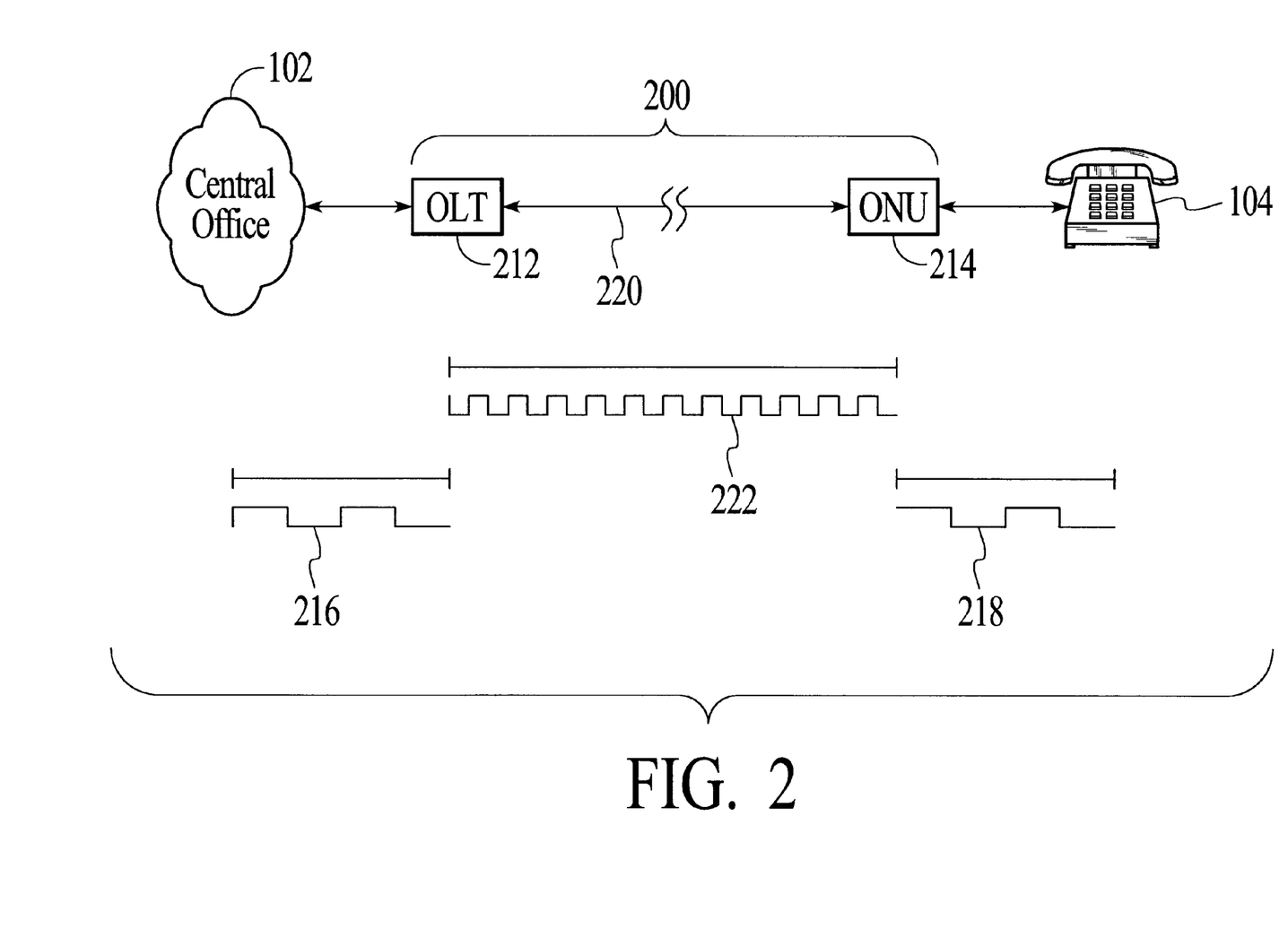
FIG. 2 illustrates the problem of telecom clock synchronization across an Ethernet connection.

The problem of telecom clock synchronization is illustrated in FIG. 2, which includes a simplified version 200 of the PON system 100 of FIG. 1. In FIG. 2, only a single OLT 212 and a single ONU 214 are shown. The OLT and the ONU are coupled to each other by an Ethernet connection 220. For telecommunications between the OLT 212 and the central office 102, the OLT uses a telecom clock 216. For telecommunications between the ONU 214 and the telephone 104, the ONU uses a telecom clock 218. Thus, the telecom clocks 216 and 218 must be synchronized to provide proper telecommunications between the central office 102 and the telephone 104. Any solution to the problem should efficiently and economically synchronize the telecom clock 216 at the OLT with the telecom clock 218 at the ONU. One prior art solution is for the OLT and the ONU to independently extract synchronized telecom clocks from one or more external sources. As an example, the telecom clock 216 may be derived from the central office 102, while the telecom clock 218 may be derived from a different central office (not shown). Alternatively, the telecom clock 216 may be derived from the central office 102, while the telecom clock 218 may be derived from a wireless clock source, which is synchronized with the central office. Another solution is for the OLT to transmit the telecom clock 216, which may be derived from the central office 102, to the ONU through a different medium than the Ethernet connection 220. However, both of these solutions require components that will significantly increase the cost for each ONU of the Ethernet-based PON system 100. Since the PON system may include up to one hundred twenty-eight (128) ONUs, even a modest increase in cost for each ONU will drastically increase the overall cost of the PON system.

Figure 3:
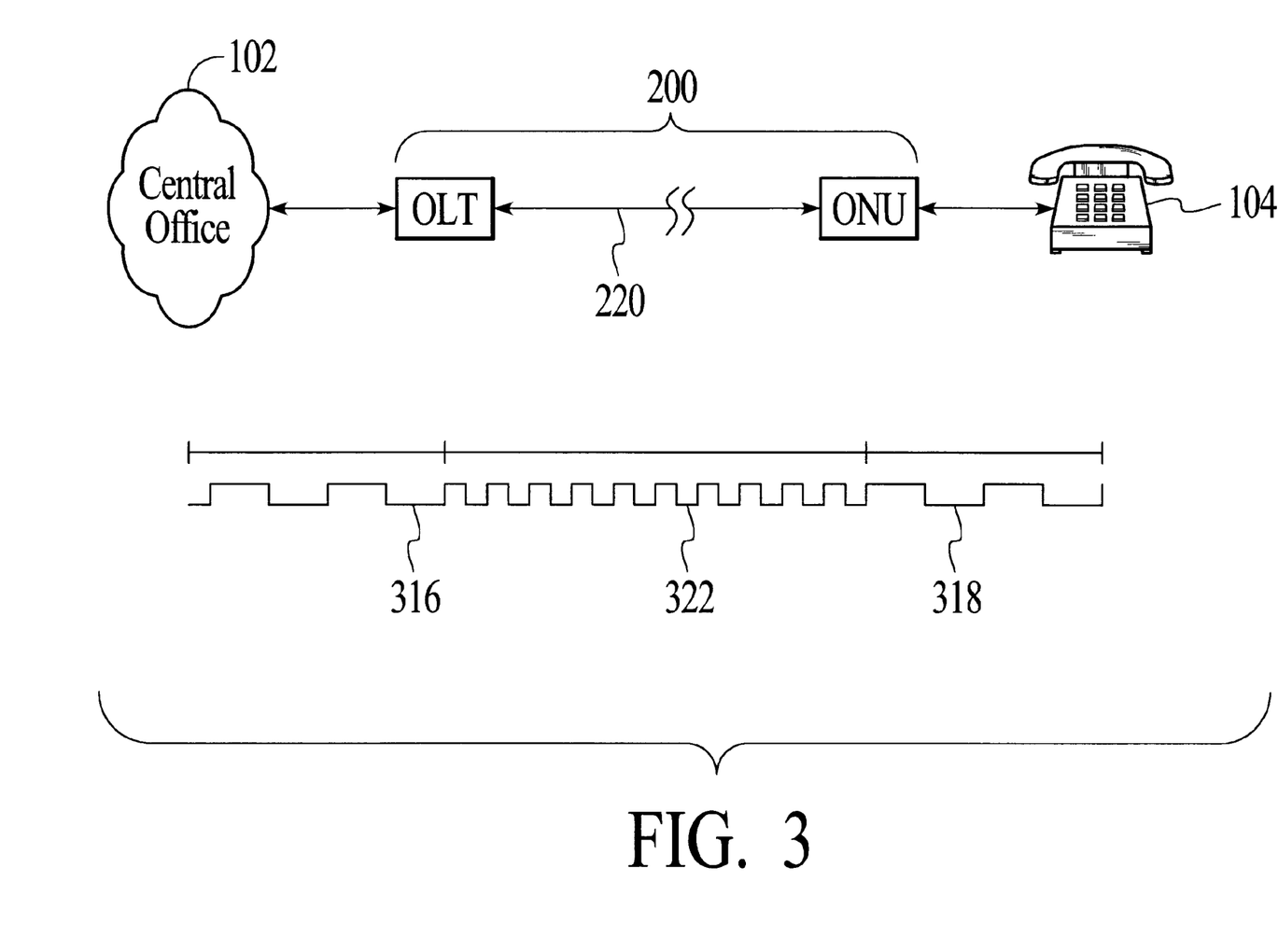
FIG. 3 illustrates the use of a data transmission timing clock to resolve the problem of telecom clock synchronization across an Ethernet connection.

The Ethernet-based PON system 100 economically solves the problem of telecom clock synchronization by utilizing a data transmission clock 222 that is used to time the transmission of data between the OLT 212 and the ONU 214. In conventional Ethernet architectures, a data transmission clock is independent from other clocks of the network, such as clocks related to telecommunications. Consequently, the data transmission clock 222 would not typically be synchronized with the telecom clocks 216 and 218, as illustrated in FIG. 2. Thus, any data transmitted using the data transmission clock does not provide information to synchronize the telecom clock 218 at the ONU 214 with the telecom clock 216 at the OLT 212. In contrast, the Ethernet-based PON system synchronizes the data transmission clock 222 with the telecom clock 216 used by the OLT to transmit the timing information of the telecom clock 216 to the ONU. The ONU then extracts the timing information from the transmitted data to generate the telecom clock 218, which is synchronized with the telecom clock 216 of the OLT. In other words, the telecom clock 218 of the ONU is synchronized with the data transmission clock 222, which in turn is synchronized with the telecom clock 216 of the OLT. FIG. 3 provides an illustration of a telecom clock 318 of the ONU that is synchronized with a data transmission clock 322, which in turn is synchronized with a telecom clock 316 of an ONU. As shown in FIG. 3, the telecom clock 318 of the ONU is thus synchronized with the telecom clock 316 of the OLT.

Figure 4:
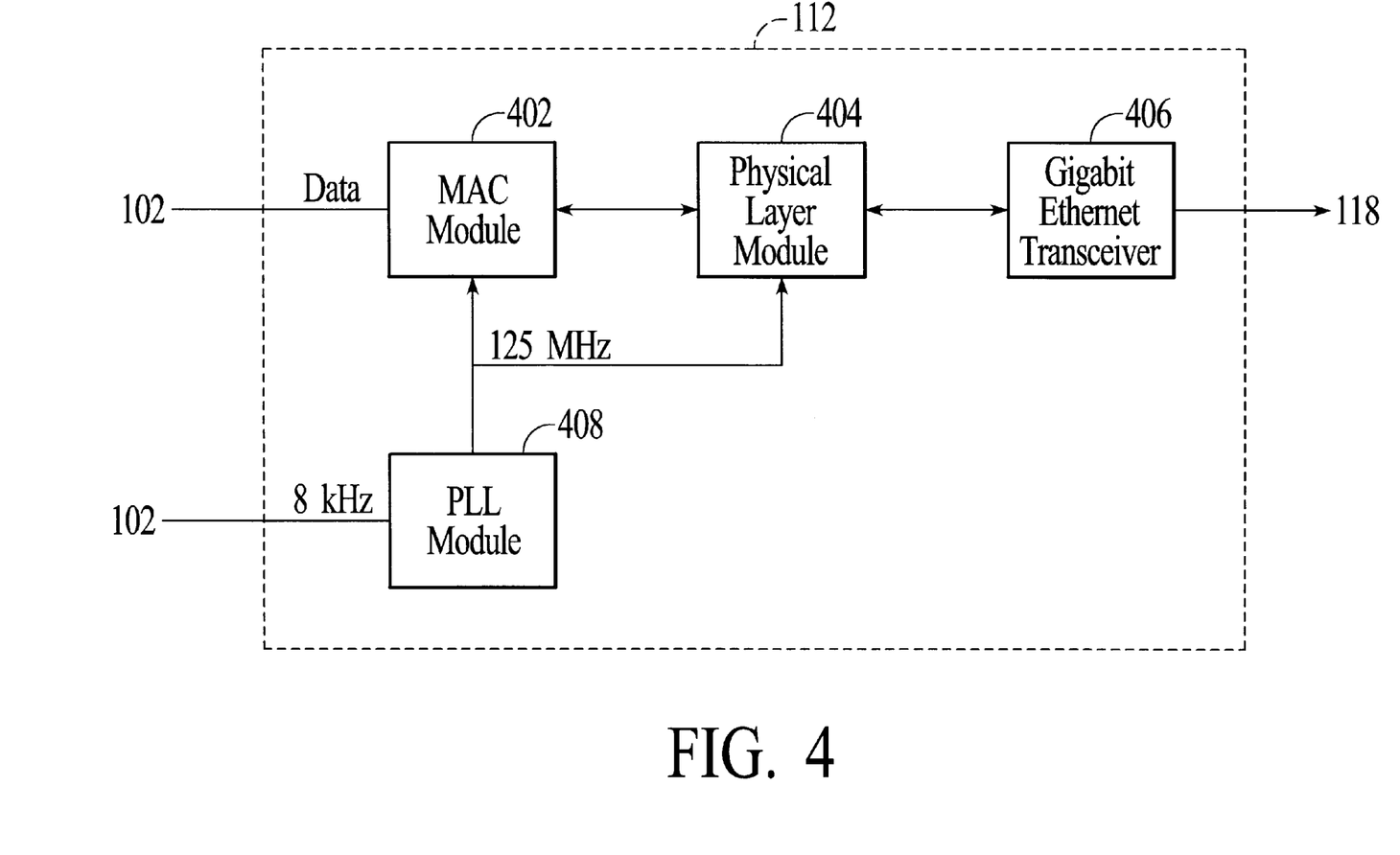
FIG. 4 is a block diagram of the components of an OLT included in the Ethernet-based PON system.

Turning to FIG. 4, the components of an exemplary OLT 112 of the Ethernet-based PON system 100 are shown. The OLT includes a media access control (MAC) module 402, a physical layer module 404, a Gigabit Ethernet transceiver 406, and a phase locked loop (PLL) module 408. The functions of these OLT components are described with respect to data transmission, since the functions are merely reversed for data reception. The MAC module 402 performs various data transfer functions in accordance with the Gigabit Ethernet protocol, including generating variable-length packets of data and encoding the outgoing data using 8B/10B coding, i.e., encoding 8 bits of data into 10 code bits e physical layer module 404 receives the encoded data from the MAC module and serializes the data for transmission. The Gigabit Ethernet transceiver 406 converts the serialized bits of data, which are electrical signals, into optical signals. The PLL module 408 provides a data transmission clock of 125 MHz to the MAC module and the physical layer module. The 125 MHz data transmission clock is generated from an 8 kHz telecom-based clock, which is synchronized with the clock at the central office 102. The 125 MHz data transmission clock is used by the physical layer module to transmit the serialized bits of data at 1.25 Gbps in accordance with the Gigabit Ethernet protocol.

The 8 kHz telecom-based clock used by the PLL module 408 is derived from the central office 102 through the DS3T 108 of the Ethernet-based PON system 100 shown in FIG. 1. The DS3T receives a high frequency reference clock from the central office. As an example, the high frequency reference clock may be a 43.232 MHz clock (T3/DS3 clock). The DS3T then divides the high frequency reference clock to produce the 8 kHz telecom-based clock, which is then distributed to the OLTs 112 by the switch 110. At each OLT, the PLL module 408 receives the 8 kHz telecom-based clock and generates the 125 MHz data transmission clock, which is synchronized with the 8 kHz telecom-based clock. The 125 MHz data transmission clock is then transmitted to the MAC module 402 and the physical layer module 404. At the physical layer module, the 125 MHz data transmission clock is used to time the transmission rate of data. The physical layer module multiplies the 125 MHz data transmission clock by a factor of ten, and then transmits the bits of data at a rate of 1.25 Gbps. Therefore, the transmitted data, which has been timed using the 125 MHz data transmission clock, is synchronized to the timing information of the 8 kHz telecom-based clock.

Figure 5:
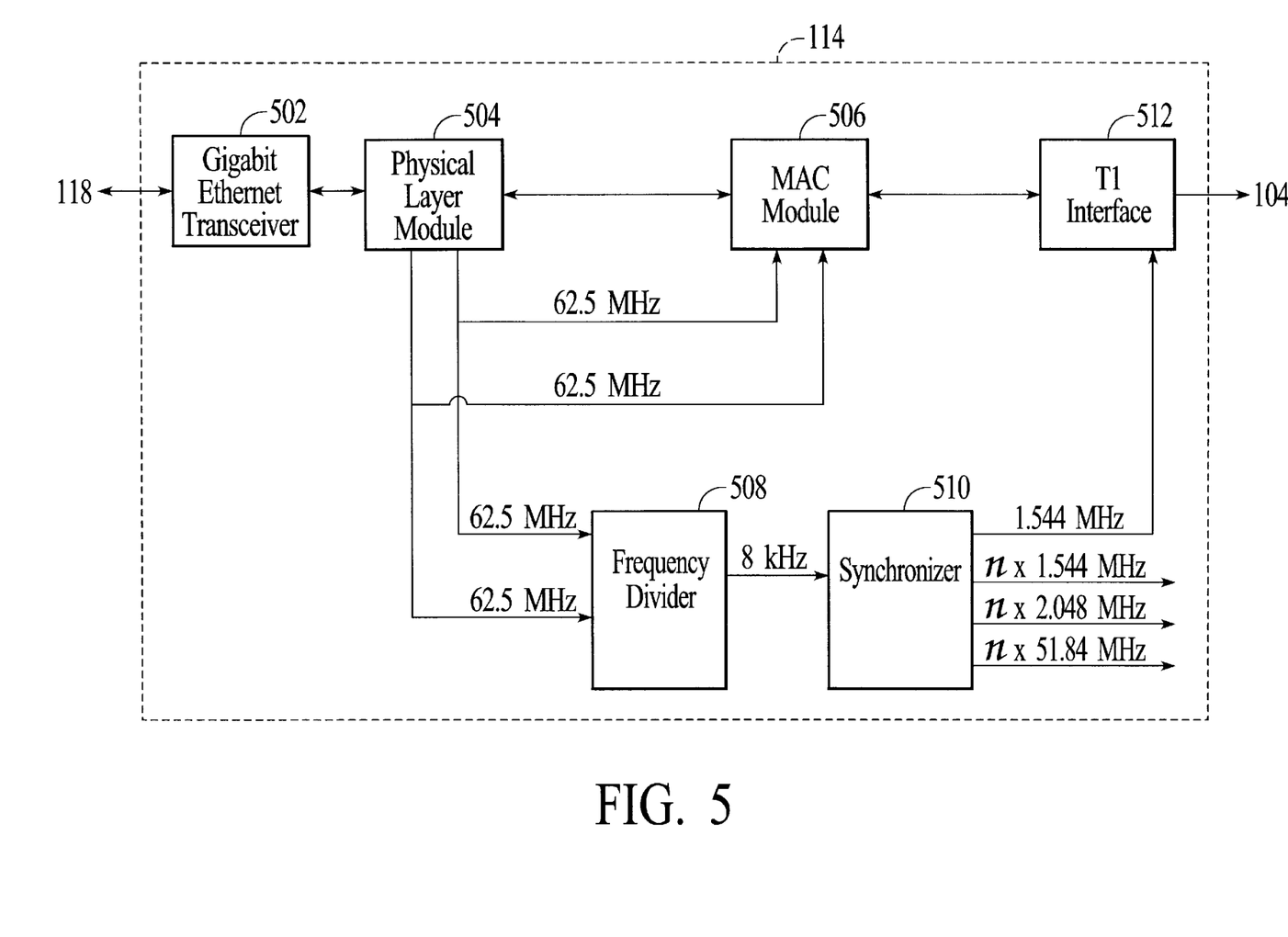
FIG. 5 is a block diagram of the components of an ONU included in the Ethernet-based PON system.

The components of an exemplary ONU 114 are shown in FIG. 5. The ONU includes a Gigabit Ethernet transceiver 502, a physical layer module 504, a MAC module 506, a frequency divider 508, and a synchronizer 510. Similar to the OLT components, the functions of the ONU components are described with respect to data reception, since the functions are merely reversed for data transmission. The Gigabit Ethernet transceiver 502 receives incoming bits of data in the form of optical signals and converts the optical signals to electrical signals. The physical layer module 504 then deserializes the converted bits of data and transmits the data bits to the MAC module 420, where the data bits are processed in accordance with the Ethernet protocol. The physical layer module 504 also generates two 180-degree phase-shifted 62.5 MHz transmission-based clocks, which are synchronized with the 125 MHz data transmission clock used by the OLT 112 for data transmission, from the incoming bits of data. That is, the 125 MHz data transmission clock used by the OLT is recovered from the incoming data by the physical layer module 504 in the form of two phase-shifted 62.5 MHz clocks. These phase-shifted 62.5 MHz clocks are then transmitted to the MAC module 506, where the two 62.5 MHz clocks are used to generate a 125 MHz clock, which is synchronized with the 125 MHz data transmission clock of the OLT, to process the received data.

The phase-shifted 62.5 MHz clocks are also transmitted to the frequency divider 508 of the ONU 114. The frequency divider generates a reference 8 kHz telecom clock from the two phase-shifted 62.5 MHz clocks by dividing the phase-shifted clocks, in this case, by a non-integer, i.e., 7812.5. Consequently, the reference 8 kHz telecom clock is synchronized with the phase-shifted 62.5 MHz clocks. Thus, the frequency divider 508 generates a low frequency clock, i.e., the reference 8 kHz telecom clock, from high frequency clocks, i.e., the two 62.5 MHz clocks. The division of high frequency clocks to generate a low frequency clock reduces errors that may have been introduced into the high frequency clocks. Therefore, the reference 8 kHz clock, which is derived from the 62.5 MHz clocks, includes fewer errors than the 62.5 MHz clocks, which results in a more accurate clock. Since the reference 8 kHz telecom clock can be traced back to the 8 kHz telecom-based clock of the OLT 112, the reference 8 kHz telecom clock is synchronized with the 8 kHz telecom-based clock of the OLT.

The reference 8 kHz telecom clock is used by the synchronizer 510 of the ONU 114 to generate one or more telecom clocks for telecom-related devices included in the ONU. In one embodiment, the synchronizer may generate a telecom clock that is a multiple of the T1 clock rate, i.e., an n×1.544 MHz clock, where n=1, 2, 3 . . . . As an example, the synchronizer may generate a 1.544 MHz telecom clock (T1 clock) from the reference 8 kHz telecom clock for a T1 interface module 512, as illustrated in FIG. 4. As another example, the synchronizer may generate a 43.232 MHz (T3/DS3 clock), which is 28 times the T1 clock rate. In another embodiment, the synchronizer may generate a telecom clock that is a multiple of the E1 clock rate, i.e., an n×2.048 MHz clock, where n×1, 2, 3 . . . . As an example, the synchronizer may generate a 2.048 MHz clock (E1 clock) from the reference 8 kHz telecom clock for one or more E1 interface modules (not shown). As another example, the synchronizer may generate a 4.096 MHz telecom clock from the reference 8 kHz telecom clock for devices (not shown) related to PCM and echo cancellation. As another example, the synchronizer may generate a 32.768 MHz telecom clock (E3 clock), which is 16 times the E1 clock rate. In still another embodiment, the synchronizer may generate a telecom clock that is a multiple of the OC1 clock rate, i.e., an n×51.84 MHz clock, where n=1, 2, 3 . . . . As an example, the synchronizer may generate a 155.520 MHz clock (OC3 clock) from the reference 8 kHz telecom clock for a DS3 terminal (not shown) included in the ONU. Using the reference 8 kHz telecom clock, the synchronizer can generate any signal that is based on an 8 kHz clock rate. The number and frequencies of the telecom clocks generated by the synchronizer are dependent on the various telecom-related devices that may be included in the ONU. Since these telecom-related clocks at the ONU are generated from the reference 8 kHz telecom clock, which is synchronized with the 8 kHz telecom-based clock at the OLT 112, the telecom-related clocks at the ONU are also synchronized with the 8 kHz telecom-based clock at the OLT 112.

An advantageous feature of the Ethernet-based PON system 100 is that only a single master clock, i.e., the 8 kHz telecom-based clock, is needed to provide synchronized telecom-related clocks to all the ONUs 114 of the system. The master clock is derived from a single external source, i.e., the central office 102, and then distributed to the OLTs of the system. Each OLT then "distributes" the clock to the ONUs that are optically connected to that OLT. Thus, the telecom-related clocks at the ONUs are all derived from the single master clock.

Figure 6:
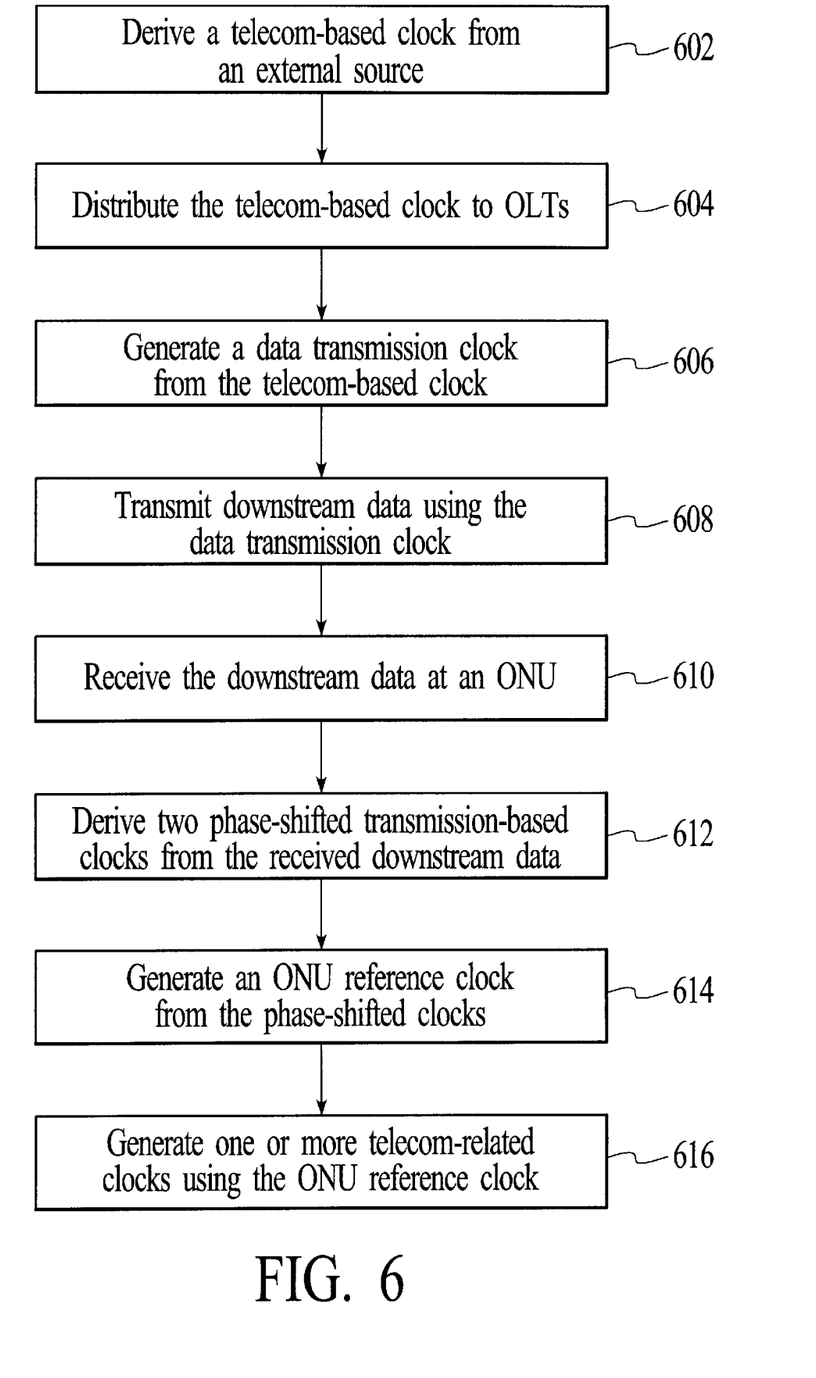
FIG. 6 is a process flow diagram of a method of synchronizing telecom clocks in an Ethernet-based PON system in accordance with the present invention.

A method of synchronizing telecom clocks throughout the Ethernet-based PON system 100 in accordance with the present invention is described with reference to FIG. 6. At step 602, a telecom-based clock is derived from an external source, for example, the central office 102, at the access module 106 of the PON system. The telecom-based clock is derived by dividing the received clock from the external source to a lower frequency clock. As an example, the clock from the external source may be a 43.232 MHz clock (T3/DS3 clock). In an exemplary embodiment, the telecom-based clock is an 8 kHz clock. At step 604, the telecom-based clock is distributed to the OLTs 112 of the Ethernet-based PON system by the switch 100 of the access module. Next, at step 606, a data transmission clock is generated from the telecom-based clock at an OLT such that the data transmission clock is synchronized with the telecom-based clock. In the exemplary embodiment, the data transmission clock is a 125 MHz clock. The data transmission clock is used by the MAC module 402 and the physical layer module 404 of the OLT to transmit downstream data to the ONUs that are optically connected to the OLT.

Next, at step 608, the downstream data is optically transmitted in variable-length packets in accordance with a prescribed protocol using the data transmission clock. The downstream data is transmitted at a predetermined transmission rate, which is defined by the data transmission clock. In the exemplary embodiment, the prescribed protocol is Gigabit Ethernet and the data transmission rate is 1.25 Gbps. The use of the data transmission clock, which is synchronized with the telecom-based clock, to transmit the downstream data has the effect of embedding timing information from the telecom-based clock into the data transmission clock. At step 610, the downstream data is received at an ONU of the Ethernet-based PON system 100. Next, at step 612, two phase-shifted transmission-based clocks are derived from the received downstream data, which are received at the transmission rate defined by the data transmission clock of the transmitting OLT. The phase-shifted clocks are generated by the physical layer module 504 of the receiving ONU. Since these phase-shifted clocks are derived from the downstream data that was transmitted using the data transmission clock, the phase-shifted clocks are synchronized with the telecom-based clock at the transmitting OLT. In the exemplary embodiment, the two phase-shifted clocks are two 62.5 MHz clocks, which are phase shifted by 180 degrees with respect to each other.

Next, at step 614, an ONU reference clock is generated from the two phase-shifted clocks by the frequency divider 508 of the ONU. Since the phase-shifted clocks can be traced back to the telecom-based clock at the OLT, the ONU reference clock is synchronize with the telecom-based clock. At step 616, one or more telecom-related clocks are generated by the synchronizer 510 of the ONU using the ONU reference clock. The telecom-related clocks may include a 1.544 MHz clock for a T1 interface, a 2.048 MHz clock for an E1 interface, or a 43.232 MHz clock for a DS3 interface. In addition, the telecom-related clocks may include a 4.096 MHz clock for devices related to PCM and echo cancellation, as well as other clocks that may be needed for telecommunications. Since these telecom-related clocks are derived from the ONU reference clock, which is synchronized with the telecom-based clock at the OLT, the telecom-related clocks at the ONU are also synchronized with the telecom-based clock at the OLT.

What is claimed is:

1. A method of distributing a telecom-based master clock in a point-to-multipoint optical network comprising:
   deriving said telecom-based master clock at a central terminal of said point-to-multipoint optical network from an external source;
   generating a data transmission clock that is substantially synchronized with said telecom-based master clock, said transmission clock being a higher frequency clock than said telecom-based master clock; and
   transmitting data in variable-length packets from said central terminal to remote terminals, said data being transmitted at a transmission rate defined by said data transmission clock to carry timing information from said telecom-based master clock to said remote terminals.

2. The method of claim 1 wherein said step of transmitting said data in said variable-length packets includes transmitting said data in said variable-length packets that are substantially compliant to an Ethernet-based protocol.

3. The method of claim 2 wherein said step of transmitting said data in said variable-length packets includes transmitting said data in said variable-length packets that are substantially compliant to a Gigabit Ethernet-based protocol.

4. The method of claim 1 wherein said step of deriving said telecom-based master clock includes dividing a telecom-related clock from said external source to derive said telecom-based master clock, said telecom-based master clock being an 8 kHz clock.

5. The method of claim 4 wherein said step of generating said data transmission clock includes generating a 125 MHz clock using said 8 kHz clock.

6. A method of synchronizing a remote clock with a telecom-based master clock in a point-to-multipoint optical network comprising:

receiving data in variable-length packets at a remote terminal of said point-to-multipoint optical network, said data being transmitted from a central terminal of said point-to-multipoint optical network at a transmission rate defined by a data transmission clock that is substantially synchronized with said telecom-based master clock;

deriving a reference clock by extracting a timing information of said data transmission clock from said data, said reference clock being substantially synchronized with said data transmission clock; and generating a telecom-related clock from said reference clock, said telecom-related clock being substantially synchronized with said telecom-based master clock.

7. The method of claim 6 wherein said step of receiving said data in said variable-length packets includes receiving said data in said variable-length packets that are substantially compliant to an Ethernet-based protocol.

8. The method of claim 7 wherein said step of receiving said data in said variable-length packets includes receiving said data in said variable-length packets that are substantially compliant to a Gigabit Ethernet-based protocol.

9. The method of claim 6 further comprising a step of generating a transmission-based clock using said transmission rate of said data, said transmission-based clock being substantially synchronized with said data transmission clock that defined said transmission rate.

10. The method of claim 9 wherein said step of generating said transmission-based clock includes generating two transmission-based clocks that are phase shifted.

11. The method of claim 10 wherein said two transmission-based clocks are two 62.5 MHz clocks that are phase shifted by 180 degrees to each other, and wherein said data transmission clock is a 125 MHz clock.

12. The method of claim 6 wherein said telecom-based master clock and said reference clock are 8 kHz clocks.

13. The method of claim 6 wherein said step of generating said telecom-related clock from said reference clock includes generating said telecom-related clock selected from a group consisting of a 1.544 MHz clock, a 2.048 MHz clock, a 51.84 MHz clock, and multiples thereof.

14. A method of synchronizing clocks related to telecommunications in a point-to-multipoint optical network comprising:

deriving a telecom-based clock at a first network terminal of said optical network from an external source;

generating a data transmission clock from said telecom-based clock, said data transmission clock being substantially synchronized with said telecom-based clock;

transmitting data in variable-length packets from said first network terminal using said data transmission clock to embed a timing information of said telecom-based clock into said data;

deriving a reference clock by extracting said timing information of said telecom-based clock from said data, said reference clock being substantially synchronized with said telecom-based clock; and generating a remote telecom-related clock from said reference clock, said remote telecom-related clock being substantially synchronized with said telecom-based clock.

15. The method of claim 14 wherein said step of transmitting said data in said variable-length packets includes transmitting said data in said variable-length packets that are substantially compliant to an Ethernet-based protocol.

16. The method of claim 15 wherein said step of transmitting said data in said variable-length packets includes transmitting said data in said variable-length packets that are substantially compliant to a Gigabit Ethernet-based protocol.

17. The method of claim 14 further comprising a step of generating a transmission-based clock using said transmission rate of said data, said transmission-based clock being substantially synchronized with said data transmission clock that defined said transmission rate.

18. The method of claim 17 wherein said step of generating said transmission-based clock includes generating two transmission-based clocks that are phase shifted.

19. The method of claim 18 wherein said two transmission-based clocks are two 62.5 MHz clocks that are phase shifted by 180 degrees to each other, and wherein said data transmission clock is a 125 MHz clock.

20. The method of claim 15 wherein said telecom-based clock and said reference clock are 8 kHz clocks.

21. The method of claim 15 wherein said step of generating said remote telecom-related clock from said reference clock includes generating said telecom-related clock selected from a group consisting of a 1.544 MHz clock, a 2.048 MHz clock, a 51.84 MHz clock, and multiples thereof.

22. A point-to-multipoint optical network system comprising:

a central access module coupled to an external telecommunications network, said central access module comprising:

a network interface that receives data from said external telecommunications network, said network interface configured to obtain a telecom-based clock from said external network;

a transmission clock generator configured to generate a data transmission clock using said telecom-based clock, said data transmission clock being substantially synchronized with said telecom-based clock; and a transmitting sub-system that transmits said data in variable-length packets at a prescribed data rate, said prescribed data rate being defined by said data transmission clock to carry timing information of said telecom-based clock with said data; and a plurality of remote terminals optically coupled to said central access module to receive said data, each remote terminal comprising:

a receiving sub-system that extracts said timing information of said telecom-based clock from said data and generates a reference clock; and a remote clock generator configured to generate a remote telecom-related clock from said reference clock, said remote telecom-related clock being substantially synchronized with said telecom-based clock at said central access module.

23. The system of claim 22 wherein said transmitting sub-system of said central access module is configured to transmit said data in said variable-length packets that are substantially compliant to an Ethernet-based protocol.

24. The system of claim 23 wherein said transmitting sub-system of said central access module is configured to transmit said data in said variable-length packets that are substantially compliant to a Gigabit Ethernet-based protocol.

25. The system of claim 22 wherein said receiving sub-system includes:

a physical layer module that generates a transmission-based clock from said data, said transmission-based clock being substantially synchronized with said data transmission clock; and a frequency divider operatively coupled to said physical layer module that generates said reference clock from said transmission-based clock.

26. The system of claim 25 wherein said physical layer module generates two transmission-based clocks, said two transmission-based clocks being 62.5 MHz clocks that are phase shifted by 180 degrees.

27. The system of claim 22 wherein said telecom-based clock and said reference clock are 8 kHz clocks.

28. The system of claim 22 wherein said clock generator is configured to generate said telecom-related clock selected from a group consisting of a 1.544 MHz clock, a 2.048 MHz clock, a 51.84 MHz clock, and multiples thereof.

* * * * *